Oct. 7, 1958  F. K. H. NALLINGER  2,855,066
INSTRUMENT PANELS, ESPECIALLY FOR MOTOR VEHICLES
Filed Sept. 17, 1956
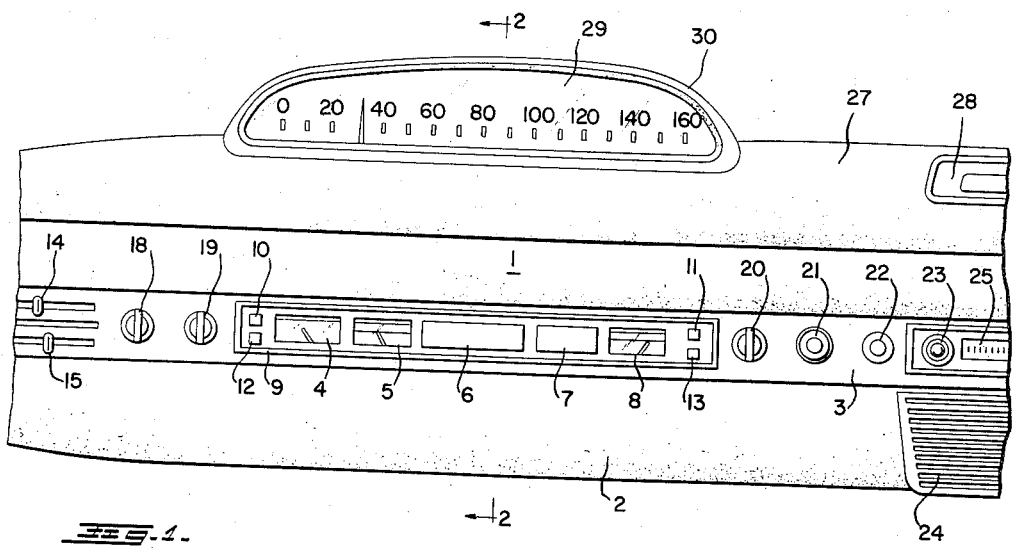
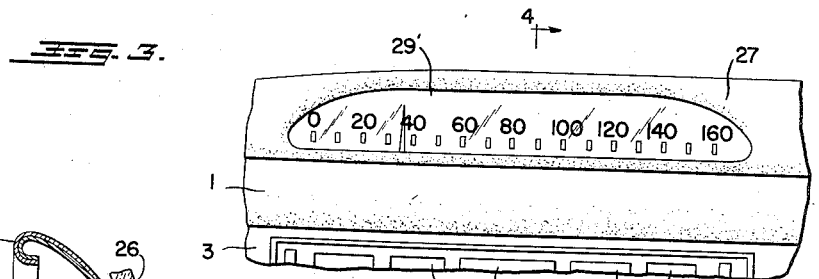
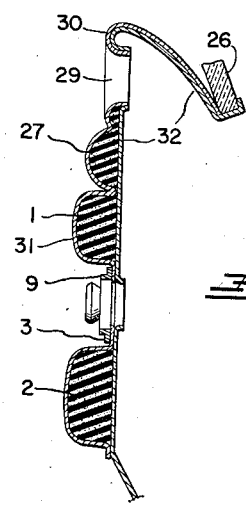
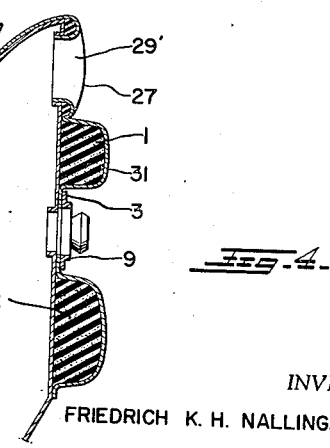
INVENTOR
FRIEDRICH K. H. NALLINGER
BY Dicke and Craig
ATTORNEYS

United States Patent Office 2,855,066
Patented Oct. 7, 1958

2,855,066

INSTRUMENT PANELS, ESPECIALLY FOR MOTOR VEHICLES

Friedrich K. H. Nallinger, Stuttgart, Germany, assignor to Daimler-Benz Aktiengesellschaft, Stuttgart-Unterturkheim, Germany Application September 17, 1956, Serial No. 610,314

Claims priority, application Germany October 25, 1955

5 Claims. (Cl. 180—90)

The present invention relates to an improved construction of dash boards or instrument panels for motor vehicles provided with a protective padding, and more particularly to such a construction of a dash board or instrument panel in which the individual instruments, actuating knobs, levers, etc. are recessed in the padding itself.

In the prior art devices it was usual to cover the entire dash board or instrument panel with an essentially evenly thick padding layer. The instruments were individually recessed or embedded into this padding layer or were secured therein in such a manner that upon impact on the instruments they would resiliently yield.

In other prior art constructions the dash board or instrument panel padding was subdivided into as many vertical padding blocks as there are instruments. The instruments in these arrangements were recessed into these individual blocks.

However, both of these aforementioned arrangements of the prior art require a considerable amount of time and outlay for the padding work, i. e., the initial manufacture and installation of the dash board or instrument panel provided with the padding as described hereinabove.

Furthermore, by the use of such padding constructions, padding surfaces which are full of gaps or fissures formed between adjacent blocks will result which are rather unattractive from an aesthetic point of view and which offer relatively large surfaces for the deposit of dust while the dust can only be removed with difficulty out of the recesses or gaps formed by the adjacent padding blocks.

In contrast thereto, the present invention consists essentially in that the dash board or instrument panel is provided with at least two padded bulges or pads which are arranged at a slight distance from each other and which in particular extend over the entire length of the dash board or instrument panel. Indicating devices and switch means, such as the usual instruments for indicating the fuel supply, the oil pressure, the cooling water temperature, the driven mileage, the time clock, the safety signal lamps, the actuating knobs for the heating and ventilating system, for the radio, the steering and ignition lock, etc. are recessed between these two padding bulges in such a manner that the padded bulges extend therebeyond in a protective manner.

A particularly advantageous arrangement will result if the individual indicating devices and actuating members are combined on a switch panel or molding disposed between the padded bulges and if only the speedometer is either displaced within the driver's view forwardly toward the windshield edge, is arranged on the upper bulge or is recessed therein.

Such a construction enables the use of only two or at the most three padded bulges or ledges at the dash board or instrument panel which require relatively little padding work, which do not impede the accessibility to the switching knobs, which permit ready inspection of the instruments and provide an effective protection for the passengers as well as for the instruments themselves.

Furthermore, the padded bulges in accordance with the present invention provide a good aesthetic effect as they adapt themselves readily in the over-all shape and design thereof to the contour of the lower windshield edge and thereby make the vehicle appear relatively wide.

Accordingly, it is an object of the present invention to provide a padded dash board or instrument panel for a motor vehicle which is relatively simple and inexpensive as regards manufacture, assembly and installation.

Another object of the present invention is to provide a padded dash board or instrument panel which offers good protection for both the instruments and the passengers of the vehicle.

Another feature of the present invention resides in the provision of a dash board or instrument panel provided with two bulges separated from each other by a small distance and providing therebetween a recessed channel which accommodates all the instruments and actuating knobs, protected by the padded bulges which extend therebeyond, as well as the connections and possibly also the fuses.

Still another object of the present invention is the provision of such a dash board or instrument panel padding for motor vehicles which minimizes the collection of dust, may be readily cleaned and offers an attractive appearance to the driver.

These and further objects, features and advantages of the present invention will become more obvious from the following description when taken in connection with the accompanying drawing which shows, for purposes of illustration only, two embodiments in accordance with the present invention, and wherein:

Figure 1 is a front view of a section of a dash board or instrument panel in accordance with the present invention as seen from the driver's seat and in which the speedometer is placed on the upper part thereof.

Figure 2 is a cross-sectional view taken along line 2—2 of Figure 1.

Figure 3 is a front view of an instrument panel similar to Figure 1 in which the speedometer is recessed into the upper padded bulge, and Figure 4 is a cross-sectional view, similar to Figure 2, of the embodiment according to Figure 3.

Referring now to the drawing, wherein like reference numerals are used throughout the various views and more particularly to Figures 1 and 3, two padded bulges are designated by reference numerals 1 and 2 respectively which extend transversely of the vehicle over the entire length of the instrument panel. The padded bulges 1 and 2 are disposed essentially parallel to each other and at a small distance from each other.

The padded bulges 1 and 2 may consist either directly of the elastic material, for example, of sponge rubber, foamed latex, or solid rubber, or may also be formed by a cover filled with any suitable padding material or by a cover into which a hose or the like is inserted which is filled with air. The cover may be made of leather, textile material, rubber or synthetic plastic material and may exhibit any desired decorative surface design.

A switch panel or mold 3 is disposed between the two bulges 1 and 2 which form a protected channel therebetween accommodating the panel 3. The panel 3 may be made, for example, of metal, of synthetic material or of wood, and the surface thereof is so treated that it simultaneously has a decorative effect.

In the embodiment illustrated herein, the surface of the panel is roughened to provide, for example, a criss-cross design or herringbone design.

In addition to the window-like apertures 4, 5, 6, 7 and 8 for the various indicators, for example, of the water temperature, the oil pressure, the driven mileage, the fuel tank contents, etc. the panel 3 is further provided within the space defined by the decorative frame 9 surrounding these windows by the safety signal lamps 10, 11, 12 and 13 which provide for the driver a light signal to indicate that the fuel supply must be replenished, oil must be replenished, the cooling water is too hot, etc.

To the right and left of the decorative frame 9 are provided the control slide members 14 and 15 for the vehicle heating and ventilating system, the switches 18 and 19 for the interior and external lights, a switch 20, for example, for an additional spring system, the ignition lock 21, an auxiliary switch 22 for a third horn, the actuating knobs 23, a radio receiver 24 with the scale 25 thereof, etc.

The arrangement of the aforementioned indicating and switching arrangement is not limited either to the number mentioned nor to the sequence nor to the indicated purposes. The listing thereof is only intended for purposes of illustration to indicate how all the indicating and switching arrangements are combined on the switch panel 3 of the vehicle, and more particularly in such a manner that the two padded bulges 1 and 2 project in the longitudinal rearward direction of the vehicle protectively beyond the knobs, levers and sliding members extending away from the panel 3, as is clearly indicated in the cross-sectional views of Figures 2 and 4.

In both embodiments according to Figures 1 and 3, a terminal padded ledge 27 is provided which covers the lower edge of the windshield 26. An ashtray 28 may be recessed in the padded ledge 27, for example, above the radio receivers 23, 24 and 25.

The two embodiments according to Figures 1 and 2 and according to Figures 3 and 4 differ from each other only in that in the embodiment according to Figures 1 and 2 the speedometer 29 is arranged as a separate housing which is displaced rearwardly on the terminal padding ledge 27 by itself, whereas in the embodiment according to Figures 3 and 4, the speedometer 29' is embedded or recessed into the terminal padding ledge 27. In the latter construction the separate padded protective cover for the housing 30 of the speedometer 29 of Figure 1 may be dispensed with if such padding is deemed necessary at all.

The present invention is not limited to the embodiments illustrated herein. For example, the switching panel 3 may also serve as a terminal strip or cover for a gap or channel disposed therebehind through which the individual instruments and connections with the switches as well as possibly also the fuses are readily accessible after removal of the ledge.

The embodiments described hereinabove are also suited for use in connection with airplanes, or marine vehicles.

While I have shown and described two embodiments in accordance with the present invention, it is understood that it is not limited thereto but is susceptible of many changes and modifications, and I intend to cover all of such changes and modifications except as defined by the appended claims.

I claim:

1. In a motor vehicle having a windshield, an instrument panel comprising two passenger-protective padded bulge means extending transversely of the vehicle to the rear of said windshield, said two padded bulge means being separated a small distance from each other to form therebetween an uninterrupted narrow channel, and indicating devices and switch means arranged in said channel, said two padded bulge means projecting in the longitudinal rearward direction of said vehicle beyond the contours of said indicating devices and switch means.

2. In a motor vehicle body having a windshield, an instrument panel comprising two passenger-protective padded bulge members to the rear of said windshield, said two padded bulge members being separated a small distance from each other to form therebetween an uninterrupted narrow channel, and indicating devices and switch means arranged in said channel on a strip, said two padded bulge members extending transversely of the vehicle over the entire length of said strip and projecting in the longitudinal rearward direction of said vehicle body beyond the contours of said indicating devices and switch means.

3. In a motor vehicle body having a windshield, an instrument panel comprising two passenger-protective padded bulge members to the rear of said windshield, said two padded bulge members being separated from each other by a small distance to form therebetween a narrow uninterrupted channel, indicating devices and switch means arranged in said channel on a strip, said two padded bulge members extending transversely of the vehicle over the entire length of said strip and projecting in the longitudinal rearward direction of the vehicle beyond said indicating devices and switch means, and a speedometer placed within the driver's view and upon the uppermost of said two padded bulge members.

4. In a motor vehicle body having a windshield, an instrument panel comprising two passenger-protective padded bulge members to the rear of said windshield, said two padded bulge members being separated from each other by a small distance to form therebetween a narrow uninterrupted channel, indicating devices and switch means arranged in said channel on a strip, said two padded bulge members extending transversely of the vehicle over the entire length of said strip and projecting in the longitudinal rearward direction of the vehicle beyond said indicating devices and switch means, and a speedometer placed within the driver's view and recessed in the uppermost of said two padded bulge members.

5. In a motor vehicle body having a windshield, an instrument panel comprising two passenger-protective padded bulge members to the rear of said windshield, said two padded bulge members being separated from each other by a small distance to form therebetween a narrow uninterrupted channel, and indicating devices and switch means arranged in said channel on a strip, said two padded bulge members extending transversely of the vehicle over the entire length of said strip and projecting beyond said indicating devices and switch means in the longitudinal rearward direction of said vehicle body, and said two padded bulge members being made of elastic material selected from the group consisting of covered and uncovered sponge rubber and foamed latex.

References Cited in the file of this patent

UNITED STATES PATENTS 2,375,567    Luton _____ May 8, 1945

FOREIGN PATENTS 733,908    Great Britain _____ July 20, 1955